US010559961B2

(12) United States Patent
Striuli

(10) Patent No.: US 10,559,961 B2
(45) Date of Patent: Feb. 11, 2020

(54) METHOD AND APPARATUS FOR MANAGING ELECTRIC ENERGY PRODUCED LOCALLY FOR SELF-CONSUMPTION AND DISTRIBUTED TO MULTIPLE USERS BELONGING TO ONE OR MORE COMMUNITIES OF USERS

(71) Applicant: SISVEL TECHNOLOGY S.R.L., None (IT)

(72) Inventor: Alessandro Striuli, Mestre (IT)

(73) Assignee: Sisvel Technology S.R.L., None (IT)

( * ) Notice: Subject to any disclaimer, the term of this patent is extended or adjusted under 35 U.S.C. 154(b) by 490 days.

(21) Appl. No.: 14/377,801

(22) PCT Filed: Mar. 1, 2013

(86) PCT No.: PCT/IB2013/051658
§ 371 (c)(1),
(2) Date: Aug. 8, 2014

(87) PCT Pub. No.: WO2013/128422
PCT Pub. Date: Sep. 6, 2013

(65) Prior Publication Data
US 2015/0032279 A1 Jan. 29, 2015

(30) Foreign Application Priority Data
Mar. 1, 2012 (IT) .............................. TO2012A0181

(51) Int. Cl.
*H02J 4/00* (2006.01)
*H02J 3/46* (2006.01)
*G05B 15/02* (2006.01)
(52) U.S. Cl.
CPC ................ *H02J 4/00* (2013.01); *G05B 15/02* (2013.01); *H02J 3/46* (2013.01)

(58) Field of Classification Search
CPC .......... G06Q 50/06; H02J 3/00; H01H 9/061; H01H 9/063
See application file for complete search history.

(56) References Cited

U.S. PATENT DOCUMENTS 6,697,951 B1 * 2/2004 Sinha ..................... G06Q 50/06
700/286
2003/0009265 A1 1/2003 Edwin
(Continued)

FOREIGN PATENT DOCUMENTS

CN 201523242 U 7/2010
JP 2003-134672 A 5/2003
(Continued)

OTHER PUBLICATIONS

International Search Report dated Jun. 6, 2013, issued in PCT Application No. PCT/IB2013/051658, filed Mar. 1, 2013.

*Primary Examiner* — Charles E Anya
(74) *Attorney, Agent, or Firm* — Workman Nydegger

(57) ABSTRACT

A method for managing the supply of electric energy to a community of users (UP1, UP2, . . . UPN) includes determining a supply, to each user of the community of users (UP1, UP2, . . . UPN), of a combination of electric energy coming from at least one system for producing energy from a local source (100) and from the at least one system for supplying energy managed by an external distributor (110), wherein the combination of electric energy can be determined specifically for each user; adjusting, for each user of the community of users, the supply of the fraction of electric energy coming from the local source (100), as a function of the electric energy coming from the local source (100) to be distributed to the other users of the community of users (UP1, UP2, . . . UPN), so as to give priority to taking electric energy directly from the system for producing energy from
(Continued)

a local source (100) over the at least one system for supplying electric energy managed by an external distributor (110).

18 Claims, 4 Drawing Sheets

(56) References Cited

U.S. PATENT DOCUMENTS

| | | | | |
|---|---|---|---|---|
| 2008/0269953 A1* | 10/2008 | Steels | ............... | H02J 7/0004 700/295 |
| 2009/0326724 A1* | 12/2009 | Lasseter | ............... | H02J 9/062 700/287 |
| 2010/0293045 A1* | 11/2010 | Burns | ............... | G06Q 30/0208 705/14.11 |
| 2011/0015801 A1* | 1/2011 | Mazzarella | ............... | G06Q 30/018 700/297 |
| 2011/0055036 A1* | 3/2011 | Helfan | ............... | G06Q 30/04 705/26.1 |
| 2012/0029711 A1* | 2/2012 | Besore | ............... | G01D 4/004 700/287 |
| 2012/0053741 A1* | 3/2012 | Beyerle | ............... | G06F 1/3203 700/291 |
| 2012/0203387 A1* | 8/2012 | Takayama | ............... | H01M 10/441 700/291 |
| 2012/0271470 A1* | 10/2012 | Flynn | ............... | H02J 3/383 700/292 |
| 2012/0299383 A1 | 11/2012 | Cyuzawa et al. | | |
| 2013/0043725 A1* | 2/2013 | Birkelund | ............... | G06Q 10/04 307/24 |

FOREIGN PATENT DOCUMENTS

| | | |
|---|---|---|
| JP | 2003-134673 A | 5/2003 |
| JP | 2003-324850 A | 11/2003 |
| JP | 2006-191748 A | 7/2006 |
| JP | 2011-205871 | 10/2011 |
| JP | 2013-134672 A1 | 7/2013 |
| WO | 2011/001796 A1 | 1/2011 |
| WO | 2011/140840 A1 | 11/2011 |

* cited by examiner

METHOD AND APPARATUS FOR MANAGING ELECTRIC ENERGY PRODUCED LOCALLY FOR SELF-CONSUMPTION AND DISTRIBUTED TO MULTIPLE USERS BELONGING TO ONE OR MORE COMMUNITIES OF USERS

FIELD OF THE INVENTION

The present invention relates to the field of electric energy distribution systems, more specifically to a method and an apparatus for managing electric energy produced locally for self-consumption and distributed to multiple users belonging to one or more communities of users.

The scope of the invention relates to the management of electric energy which can be produced locally by subjects that may also be the final users thereof.

This type of energy production typically exploits so-called renewable sources, such as, for example: solar radiation, wind or biomass combustion.

The invention is applicable to all typical contexts of distributed power production scenarios; however, the preferred application concerns the management of energy produced from renewable sources (hereafter referred to as FER: (Fonti Energia Rinnovabile, in Italian), namely FER Renewable Energy Sources, to which reference will be made below without any limiting intent), by means of systems belonging to a community of potential users, usually residing in the proximity of the production site.

BACKGROUND ART

Private FER systems and FER systems for private use are, in many cases, systems for transforming solar energy: in recent years, photovoltaic systems have gone through considerable development, mainly because of two factors: very strong incentives, which have made it advantageous for people living in developed countries to invest in such systems, and a significant reduction of the costs incurred for purchasing such systems.

According to prior-art system designs, the production obtained from private photovoltaic systems can be destined to self-consumption, i.e. the energy produced can be consumed directly by the system owner without being fed into a power distribution system, or else it may be fed into the public network via a two-way meter.

Generally, therefore, the energy produced by the FER is measured for a first time by a meter installed downstream of the production system. It is then split into two parts: one part is consumed locally, and the other part is fed into the network. An additional meter is therefore needed for metering the energy fed into the network, generally a public network, by each system.

One very important feature of such systems is that power production is diffused and scattered over the territory. There are a lot of small or very small systems everywhere, an important part thereof being associated with private houses. This new characteristic of electric energy production, which no longer takes place in just a few big power plants, but in a large number of small generation centers, certainly has a very strong impact on the general infrastructures of a country's electric system. In general, the tendency towards an increase in the number of small, distributed energy sources, as opposed to big power plants, is driven by the increased number of FER's, but is not, in theory, limited to FER's only. The scope of the present invention, although referring to the exemplary case of FER's and photovoltaic systems, actually extends to any system for producing electric energy in a local and distributed manner, such as, for example, power production systems utilizing wind, biomass, fossil fuels, etc.

Therefore, the following description will generally refer to generic Local Energy Sources FLE (Fonti Locali di Energia, in Italian).

According to the prior art, therefore, the inclusion layout of a local power production system FLE or FER requires that the energy produced, made available as alternating current, be measured for a first time through a meter performing the function of measuring the total production. Subsequently the energy can be either consumed by a local user or fed into the network of a local energy distributor and sold to the latter. It is clear that the energy exchange with the local distributor is generally a two-way exchange, since the case wherein the surplus energy produced locally is sold to the local distributor is not the only possible one. In fact, it may be the case that the locally produced energy is insufficient to meet the requirements of the local user, so that the latter will have to buy energy from the local distributor. According to the prior-art, in such cases the meter between the local system and the distributor is generally a two-way meter.

For more complex self-consumption requirements, e.g. jointly-owned systems, or more in general for requirements relating to a community of users, a number of problem arise which include the problem of providing a controlled management of self-consumption by single users, who are all individually connected to the network, each with its own meter that measures the power taken from the network, and who must remain connected to the network because they must be allowed to take energy therefrom should local production be insufficient.

Many jointly-owned systems or, more in general, community systems have already been installed, exist and are operational. These are cases wherein a plurality of subjects get organized and make investments in order to create, for example, a suitably sized photovoltaic system. Such a collective investment allows to benefit from economy of scale and, in some cases, from the use of common areas (e.g. the roof of a jointly-owned building).

In typical collective systems of this kind, the system is connected to the network of a distributor (to which also the individual users are, usually but not necessarily, connected). Said distributor takes on the task of absorbing the energy produced by the system and supplying the single users with the energy they need. The balance between produced energy and consumed energy can be done off-line: therefore, there is no actual self-consumption of energy that could be used immediately as it is made available by the generation system, without going through an external distribution system.

The most common prior art offers a very simplistic solution to this problem, in that it exploits the presence of a local distributor to absorb the most part of the electric energy production, possibly with extremely low localized self-consumption, which is only limited to a single user (usually in a co-ownership). This type of management allows to apply the same layout intended for private systems characterized by having a single user to community systems as well.

The prior art does not propose a solution that allows to maximize localized self-consumption for a plurality of users, still in the presence of one or more distributors enabled to absorb and supply energy to the connected users.

With a view of making electric networks evolve into increasingly economical systems, where energy transportation is minimized, and of making consumption centers become more and more autonomous, it is apparent that localized self-consumption is a target that should be pursued. In fact, when energy can be consumed on site as soon as it is produced, savings are attained in terms of transportation, management and storage costs.

The problem that needs to be solved is, therefore, to allow distinct single users belonging to a community to directly consume locally produced energy before such energy is fed into the network of an energy distributor. Such single users must however be connected, by means of independent meters, to an energy distributor capable of meeting their energy requirements whenever local generation is absent or insufficient.

More generally, the problem that needs to be solved is to allow users connected to a generic distributor (or even to different distributors) to join together for coordinated power consumption management, such coordination including direct consumption, and the associated metering, of locally produced energy.

Allocation of energy produced and self-consumed locally must be handled with sufficient flexibility because, when multiple users compete in requesting their share of energy, the available energy must be divided in accordance with each user's rights, since it is generally possible that the users of the community contribute differently to energy production costs.

Finally, it is important that the solution offers the possibility for the community to include (and possibly to exclude) users participating in the production and self-consumption of electric energy. In general, it is important that communities can be modified and expanded without particular limitations: for this reason, it is useful that the solution be based, as far as apparatuses are concerned, on the additional installation of one apparatus for every new user, and that the general layout of the system is scalar and easily upgradable.

Patent JP-2003-134672-A describes a system for managing electric energy produced locally by a group of users. The system allows a plurality of users, each one having subscribed to a power company for power purchase, to jointly own an energy-generating photovoltaic facility, so as to use the generated power according to a fixed share assigned to the group users, or to sell any excess electric energy to the power company. This system aims at ensuring a fixed and fair distribution of the energy made available by the local source in proportion to the rights of each user in the group. When the photovoltaic power system of any user generates a electric energy surplus, the latter is sold to the power company. Given the fixed distribution of the locally generated electric energy among the users, when a user needs more energy he/she will have to purchase it from the network, thus creating a pointless double transit to and fro the network of the power company, with surplus energy produced by one or more users and sold to the power company, and energy returning from the network to a user needing more energy, which leads to higher costs and line losses. Therefore, the system described in the patent does not solve the above-described problems relating to local consumption optimization and energy saving.

SUMMARY OF THE INVENTION

It is therefore an object of the present invention to provide a method and an apparatus for managing electric energy produced locally for self-consumption and distributed to multiple users belonging to one or more communities of users, which are adapted to overcome the above-described problems.

It is an object of the present invention to a method for managing the supply of electric energy to a community of users, said community having available at least one system for producing electric energy from a local source and at least one system for supplying electric energy managed by an external distributor, characterized in that it comprises the steps of: determining a supply, to each user of said community of users, of a combination of electric energy coming from said at least one system for producing energy from a local source and from said at least one system for supplying energy managed by an external distributor, said combination of electric energy being specific for each user; adjusting, for each user of said community of users, the supply of the fraction of electric energy coming from said local source, as a function of the electric energy coming from said local source to be distributed to the other users of said community of users, so as to give priority to taking electric energy directly from said system for producing energy from a local source with respect to said at least one system for supplying electric energy managed by an external distributor.

It is a further object of the present invention a device for managing the supply of electric energy to a user belonging to a community of users, said community having available at least one system for producing electric energy from a local source and at least one system for supplying electric energy managed by an external distributor, characterized in that it comprises: means for combining electric energy coming from said at least one system for producing energy from a local source and from said at least one system for supplying energy managed by an external distributor; means for adjusting the fraction of electric energy coming from said local source supplied to said user, as a function of the electric energy coming from said local source to be distributed to the other users of said community of users; said adjusting means being configured to give priority to taking electric energy directly from said system for producing energy from a local source with respect to said at least one system for supplying electric energy managed by an external distributor.

It is a particular object of the present invention to provide a method and an apparatus for managing electric energy produced locally for self-consumption and distributed to multiple users belonging to one or more communities of users as set out in the appended claims, which are an integral part of the present description.

BRIEF DESCRIPTION OF THE DRAWINGS

Further objects and advantages of the present invention will become apparent from the following detailed description of a preferred embodiment (and variants) thereof and from the annexed drawings, which are only supplied by way of non-limiting example, wherein.

Figure 1:
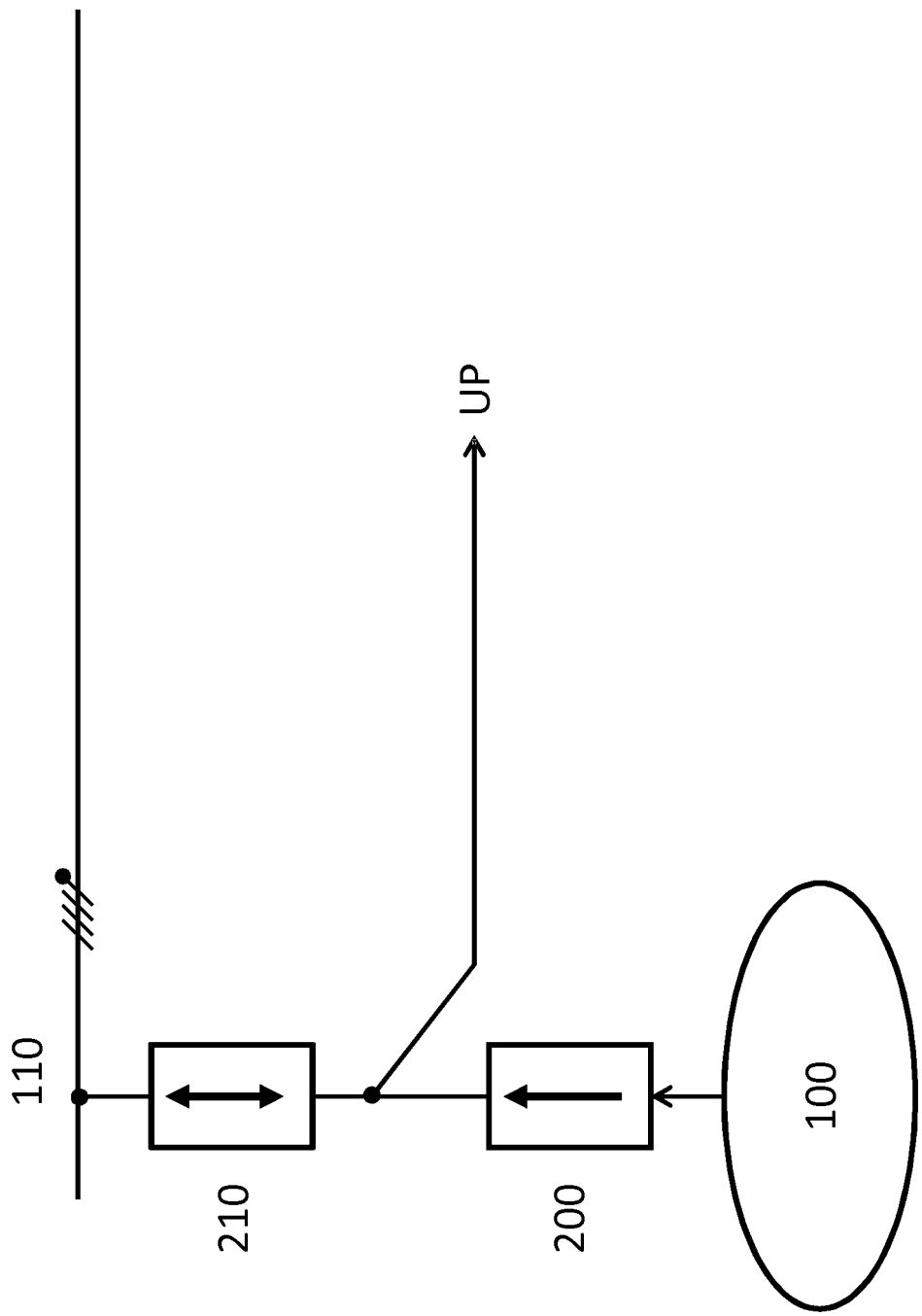
FIG. 1 describes the inclusion layout of a FLE in accordance with the prior art.

In the drawings, the arrows indicate the direction of the power flow, whereas data transmission can occur bidirectionally on all electric connection lines.

In the drawings, the same reference numerals and letters identify the same elements or components.

DETAILED DESCRIPTION OF A FEW EMBODIMENTS OF THE INVENTION

FIG. 1 describes the layout of insertion of a system for local power production FLE, designated by numeral 100. This prior-art layout allows the energy to be either self-consumed by the FLE owner or fed into a network managed by a local energy service distributor, hereafter referred to as DLSE (Distributore Locale di Servizi Energetici, in Italian): in the drawing, the network of said DLSE is designated by numeral 110. The layout of FIG. 1 only requires two meters: the meter 200, which measures all the energy produced by the FLE 100, and the meter 210, which measures the energy exchange taking place with the DLSE at a single interconnection point.

The generic block 100 may therefore be a FLE of various nature, a detailed description thereof not being necessary for the purposes of the present invention. As a whole, the FLE 100 provides an output connection where electric energy is available in a form which is compatible with the public power distribution network, i.e. as alternating current (it is therefore assumed that FLE's may incorporate, if necessary, an inverter stage for DC/AC conversion).

As can be seen, the energy produced and measured by the meter 200 located downstream of the FLE can be conveyed towards the private user UP before being fed into a distributor's network.

As aforesaid, the meter 210 is bidirectional, and can therefore meter the energy produced and unused which is fed into the network (sold energy), as well as the energy requested to the distributor (purchased energy) by the user when local production is insufficient. In fact, it often happens, and this possibility must be taken into account, that a user having a FER power production system is not fully self-sufficient from the energetic point of view, and needs energy when his/her own system is producing insufficient energy or none at all.

Solar or wind energy transformation systems are exemplary in this regard, since solar radiation and wind cannot be "activated" at will depending on energy requirements; therefore, there is a possibility that a user will need to take energy from the public network, which energy must then be appropriately metered. This further explains why the relationship with the DLSE must be supported by a two-way meter.

Figure 2:
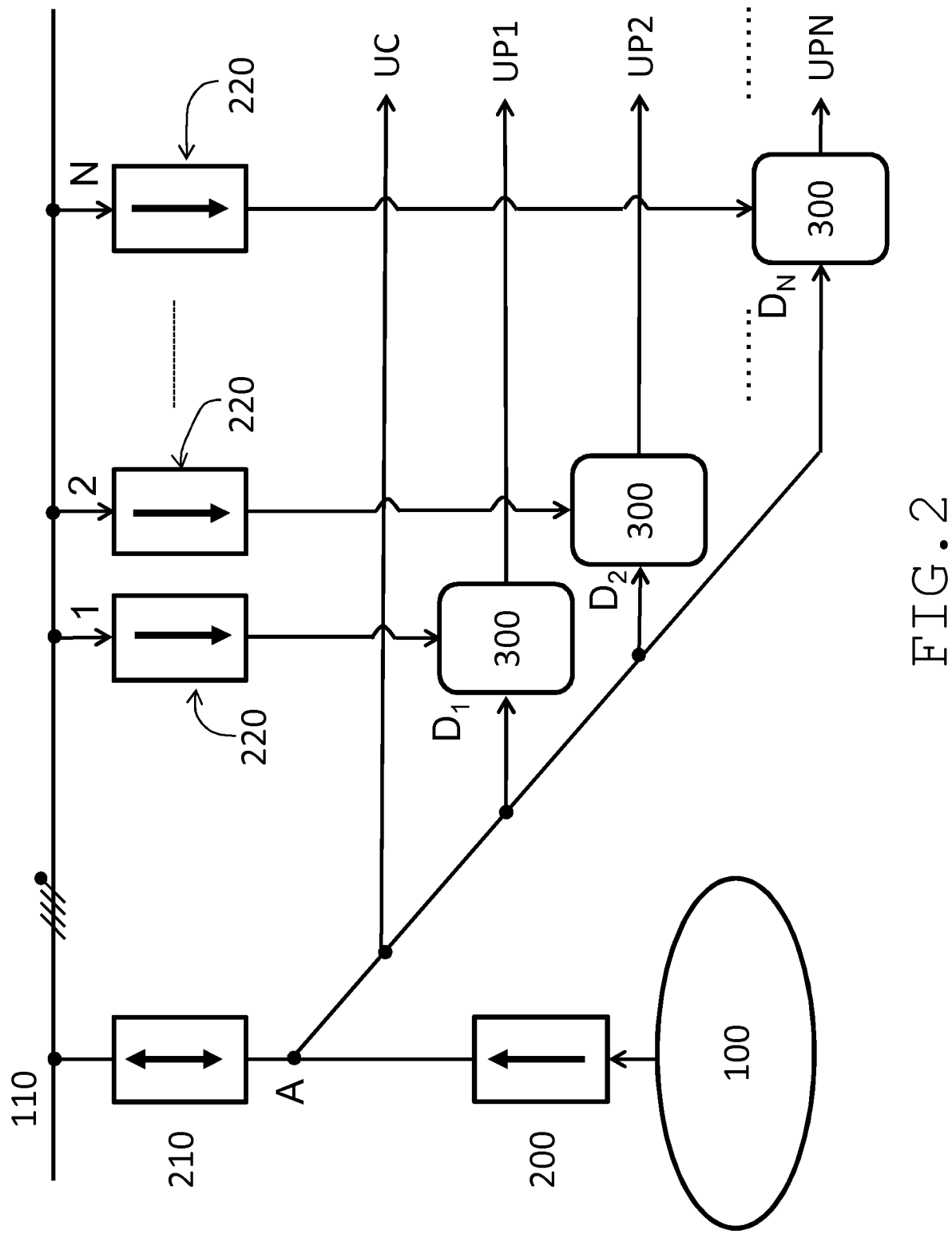
FIG. 2 describes the inclusion layout of a FLE in accordance with the invention, with management of direct self-consumption by a plurality of users.

FIG. 2 shows a basic diagram of the management of a FLE 100 in accordance with the invention. In this case, the FLE 100 belongs to a community of users UP1 . . . UPN that can consume the energy produced by it before it is fed into the network of the DLSE 110.

The proposed solution, as shown in the layout of FIG. 2, starts from the typical layout of FIG. 1, to which a number of new devices 300 have been added (which will have to be installed: each one of said new devices 300 will correspond to each user. In addition, there may be a co-ownership user UC that supplies power to devices shared by the group of users, such as, for a jointly-owned building, staircase lighting, lift, common heating system, etc. It must be pointed out that, within the framework of the present invention, the term "jointly-owned" is not to be understood as being limited to users jointly owning a building or a house, but, in a more general sense, as referring to any user belonging to a group and having the right, by whatever title, to use the energy produced by the FLE.

A comfortable solution, that should be adopted in practice when installing said devices 300, is to install them in the vicinity of the meters 220 needed by each user in order to be connected to a distributor. The functionalities of said new devices 300 may be standardized, so that they may in the future be integrated into so-called smart meters, which are expected to become widespread in the short and medium term, thus becoming a functional feature of a new type of smart meter.

FIG. 2 shows the meters 220: they are conventional meters, such as those typically installed by the DLSE at each user's for the purpose of measuring energy consumption and setting rates and any other contractual conditions (time slots, power limits, etc.). They may be either traditional meters (i.e. electromechanical meters) or latest-generation meters (e.g. smart meters). They are the N meters of the respective co-ownership users UPN, and are normal one-way meters, i.e. they only measure the consumption of every single user.

FIG. 2 as a whole shows one example of organization of a community having a FLE. As aforesaid, this layout represents an evolution of prior-art layouts, and therefore includes at least one two-way meter 210 to be installed at the point where the energy produced but not self-consumed by the community can be fed into the network of a local energy service distributor DLSE or, more in general, of a subject external to the community and enabled to exchange electric energy therewith.

The presence of a two-way meter 210, independent of the meters of the single users, facilitates the inclusion and exclusion of single users in/from the community, without requiring any action upon the relationships with the various distributors, whether those of the single users or the one to which the community system is connected.

This layout highlights how the single users can also take energy from local production via the devices 300. There is a device per user (at least one for each user of the co-ownership and, in general, of the community participating in local production); the devices are innovative objects conceived for being the only device that needs to be added to a known system layout like the one shown by way of example in FIG. 1.

The devices 300, which, as aforesaid, are innovative devices, typically perform the following functions:
they exclude the supply from the network if there is sufficient local energy available;
they offer the respective users the necessary instantaneous power, possibly by combining, if necessary, energy supplied from the network of the distributor DLSE with energy taken from local production provided by the FLE;
they meter the energy taken from local production, and possibly
communicate with the other users' devices in order to handle contentions for locally produced energy.

It should also be noted that, in a wholly general scenario, there is no constraint in regard to the energy production system FLE having to be connected to one operator only; theoretically, in fact, it may be connected to several distributors, and the community may exchange its energy with different interlocutors. This latter option may turn out quite useful when one interlocutor is a normal public distributor and the other subjects are adjacent communities enabled to exchange energy with their neighbours.

Figure 3:
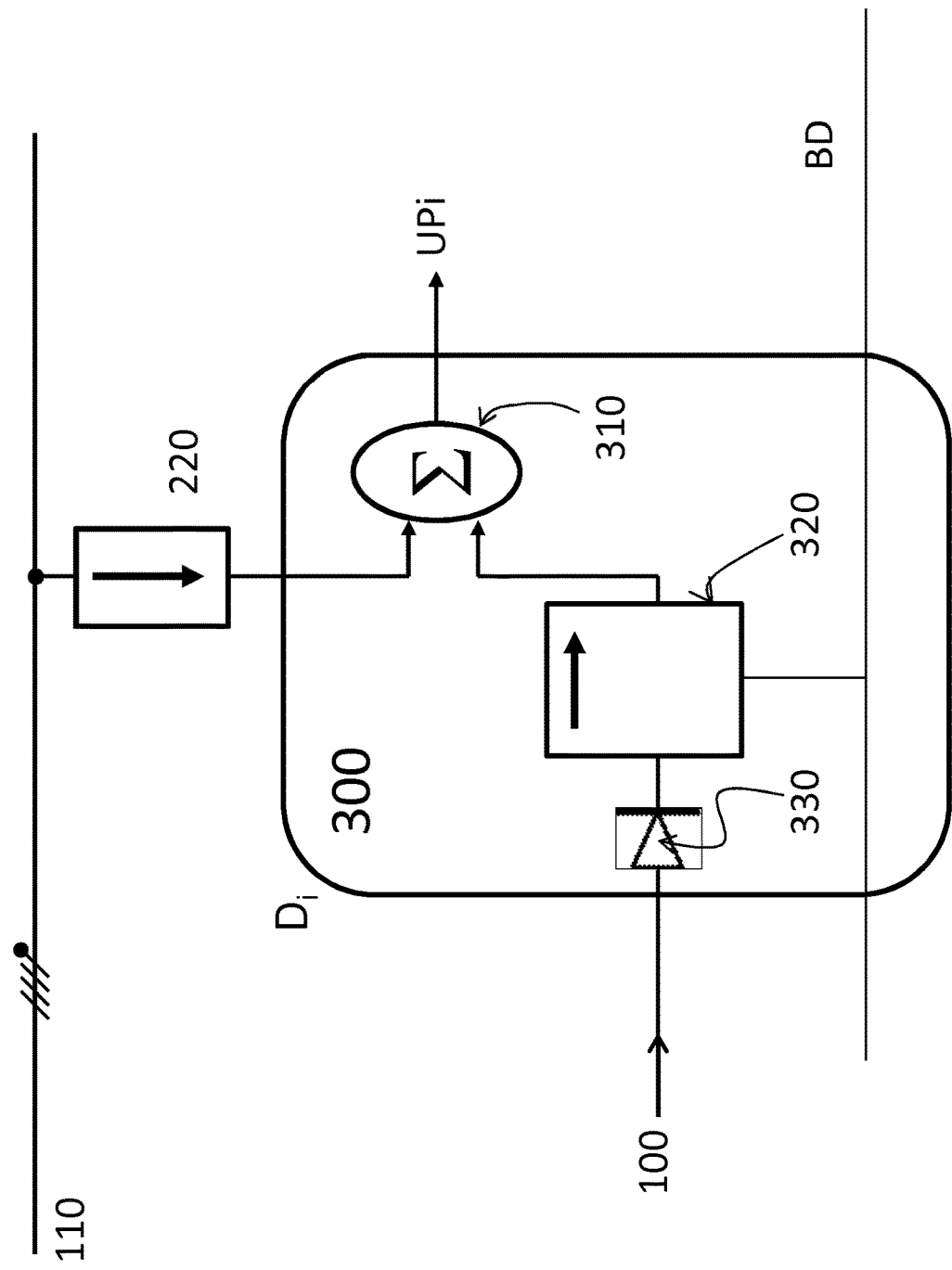
FIG. 3 describes the essential elements of the device that needs to be installed at each user in order to implement the invention.

FIG. 3 shows one of said innovative devices 300, highlighting the main components thereof.

The electric line 110 associated with the conventional meter 220, in turn associated with each user, is not directly connected to the residential network of that specific user, as is now common; instead, it is connected to the user through the innovative device 300, which comprises at least:
- a combiner 310 allowing the user to be supplied with both network power and locally produced power;
- a "smart" meter 320 adapted to meter the fraction of energy produced locally by the FLE and supplied to the user (this consumption is measured for internal co-ownership management purposes);
- an element 330, represented by the diode symbol, which prevents the energy not coming from the local production system from flowing towards the two-way meter 210, allowing the electric energy coming from said at least one system for producing electric energy from a local source (100) to flow only in the direction of said user with whom said device (300) is associated.

The combiner 310 will turn off the supply from the network if the instantaneous requirements of the user are met by the internal production, thus ensuring the utmost exploitation of the internal production; it may also limit the supply from the external public network to the energy needed for completely fulfilling the user's demand.

The smart meters 320 also carry out a function which goes beyond the simple metering task: in fact, it is generally of interest for the community to self-consume as much energy as possible, and it is generally of interest for the single users to consume locally produced energy (because its equivalent cost is lower).

It follows that, when local production is insufficient to meet the requirements of the whole co-ownership, there is potential competition for the energy available from internal production, which will have to be divided among the single users according to management criteria or policies previously agreed upon; for example, if some joint owners have contributed more to the installation of the FLE, they may be entitled to expect that the available energy will be divided by taking their greater contribution proportionally into account.

The criteria and, more in general, the policy adopted for dividing the locally produced energy among the users belonging to the community can be defined in various ways and may require different levels of communication among the devices 300 of the different users; this may range from the extreme case wherein the devices 300 do not communicate at all, limiting themselves to passively dividing the locally produced energy in accordance with a fixed limit applied to each user without taking into account the other users' consumption (and hence with no need to communicate with other devices 300), to the case wherein the devices 300 communicate with one another, exchanging information necessary for implementing the energy division criteria defined for the community of users.

In a particularly simple case, it is assumed that all users have a right to an equal share of the instantaneous electric power $P_{FLE}(t)$ locally produced by the community's FLE. Therefore, each one of the N users is entitled to a nominal power $P_{FLE}(t)/N$.

If precedence is given to self-consumption as long as a user $U_i$ absorbs less power than the nominal value, the respective device 300 ($D_i$) will limit itself to supply the required energy by taking it all, if available, from the FLE.

Figure 4:
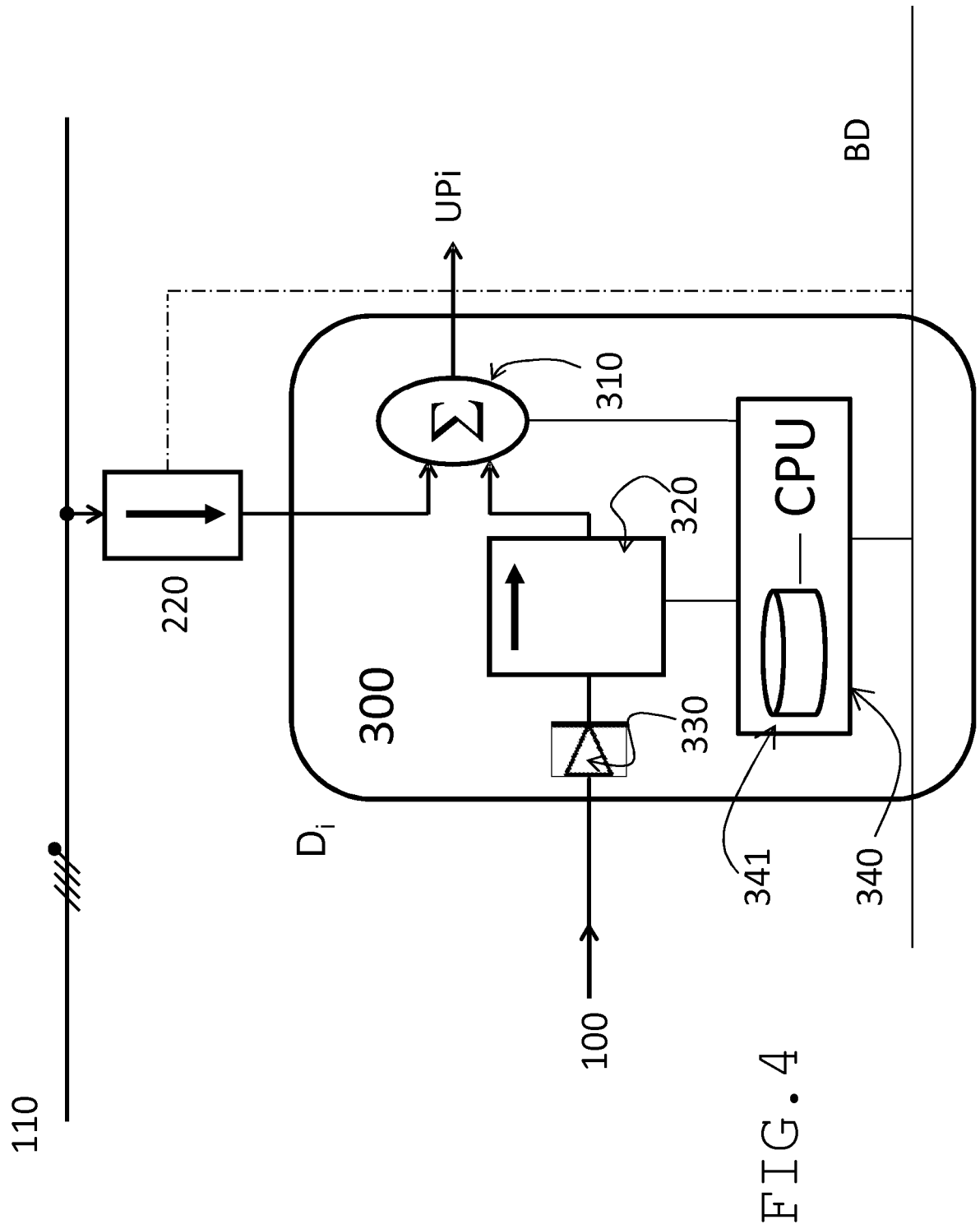
FIG. 4 shows some further preferred features of the device schematically illustrated in FIG. 3.

On the branch 100-310 of FIG. 3 or 4 there may be a dynamic limiter of transferable electric power, with an instantaneous value equal to the nominal value, so that each user is only allowed to consume such quantity of locally produced power.

The total instantaneous power value available from FLE for the community of users $P_{FLE}(t)$ can be communicated to the device 300 by the one-way meter 200, e.g. via the same electric line or via a dedicated data line. The device 300 can easily obtain from this total value a threshold value, equal for all and available for each user, which is $P_{FLE}(t)/N$.

If the fraction of the maximum power assigned to the user $P_{FLE}(t)/N$ is not enough to meet the user's energy requirements, then the combiner 310 will add the missing part to that fraction by taking it from the DLSE network 110.

Therefore, the device 300 can monitor, with an appropriate monitoring frequency, the instantaneous power consumption of its user and the instantaneous power $P_{FLE}(t)$ available from the FLE 100, and can control the combiner 310 to ensure power continuity to the associated user in accordance with the latter's instantaneous power requirements, in compliance with the criterion of utilization of the total available energy.

Of course, the smart meter 320 can measure the energy coming from the local system 100 and supplied to its respective user, thus allowing for finally counting the fraction of energy actually self-consumed by the single user of the community.

Any instantaneous power quantity produced by the FLE in excess of the total sum of the consumptions of the single users can be sold to the DLSE network 110 via the two-way meter 210, which will measure the value thereof.

A more complex case takes into account a co-ownership energy management criterion according to which, although it is still based on the principle of equality, any power absorption surplus required by a local user in excess of the nominal fraction $P_{FLE}(t)/N$ can be fulfilled by giving priority to direct supply from the local production, so as to maximize energy self-consumption to detriment of the quantity sold to the DLSE, without however forcing any other co-ownership users to take power from the network 110 to meet their instantaneous power requirements.

Unlike the previously described case, in this scenario the device 300 also monitors the power absorption of the other users in order to know the instantaneous power absorbed by the other users and be able to calculate the maximum power value that can be taken from the FLE 110, while at the same time observing the condition imposed by the energy management criteria: when a user is absorbing power in excess, the other users must not need to take energy from the network 110 to fulfill their requirements, if the local instantaneous power produced by the FLE is less than the total co-ownership's demand.

If this condition is met, the device 300 will supply its user with all the energy surplus instantaneously produced by the local source FLE 100; the combiner 310 will take from the network 110 any remaining power portion that may be needed by the user.

If only a fraction of the consumption surplus can be taken from the FLE without forcing other users to fulfill a part of their energy requirements from the network 110, then the device 300 will limit the supply of power from the FLE to the maximum value allowed without violating that restriction; as usual, the combiner 310 will make up for the remaining demand by taking the missing power from the DLSE's network 110.

The data relating to the energy consumptions of the other co-ownership users, measured by the other devices 300, can be transmitted by means of conveyed waves on the same electric line shared by the inputs of all the devices 300 or via a dedicated data line.

It may happen that, when a user's demand exceeds the nominal power value, the local energy production can no longer cover the absorption surplus because of a decrease in the local production and/or of a sudden increase in the total absorption of the co-ownership users. In such a case, the device 300 will adapt itself to the new situation by limiting again the power absorbed from the FLE 100 to the nominal value adopted prior to the overrun and by taking from the network 110, through the combiner 310, the remaining fraction necessary for fulfilling the user's demand.

It is also conceivable that one or more privileged users are allowed to secure for themselves all the energy of the FLE in accordance with a division criterion specifically reserved for them, and that only any excess production of the FLE in addition to the total consumption of that privileged group can be distributed in accordance with another division criterion reserved for the remaining users, who therefore belong to a second non-privileged group of users entitled to use the locally produced energy only when there is a surplus over the privileged users' total consumption.

In another scenario, it may happen that the users have diversified rights to use the energy coming from the local energy source 110, e.g. because they gave different contributions (called shares $q_i$) to the installation of the latter.

Let us take as an example the case wherein there are N=3 co-ownership users $U_1$, $U_2$ and $U_3$, wherein $U_1$ is entitled to use 50% of the energy produced by the FLE, while $U_2$ can use 30% and $U_3$ can use 20%.

Therefore, the FLE energy shares will be $q_1=0.5$, $q_2=0.3$ and $q_3=0.2$, respectively.

The same energy management criteria already described for the equal division case can be applied, provided that the nominal power $P_{FEL}(t)/3$, which in the previous case was the same for all three users, is changed with the diversified nominal power $q_1 \cdot P_{FEL}(t)$ for $U_1$, $q_2 \cdot P_{FEL}(t)$ for $U_2$ and $q_3 \cdot P_{FEL}(t)$ for $U_3$.

In this scenario as well, one can apply either the rigid and static management criterion according to which, when the nominal power assigned to a user is exceeded, the device 300 will always take all the missing energy from the network 110, or the more flexible one according to which the device 300, before using the DLSE's network, will take that energy from the available fraction produced by the FLE that exceeds the total demand of the co-ownership users.

The limitation of the supply of local energy to a user enforced by the device 300 may also be programmable in accordance with appropriate calendars.

In any case, the devices $D_i$ 300 will adjust the division of the locally available energy (according to dynamic or preset criteria) as a function of the number of potential users requiring said energy. In general, it is possible to determine the policies of energy supply from the power sources (local source 100 and DLSE's network 110) in a single device 300 specifically for each user, by using identical or diversified criteria for the users of the same community. They can also be specified when installing the device or varied in operation to meet any operational needs, e.g. when users are added or removed because of subdivisions or consolidations of housing units, changes in the co-ownership management policy, etc.

The distributing devices 300 need non-null time intervals to be able to measure input and output electric power, as well as to make appropriate decisions based on the energy criterion in force and act accordingly upon the energy flows.

Furthermore, the electronic or electromechanic elements making up a device 300 are affected by operating tolerances that may cause the device to deviate from its nominal behavior.

For these reasons, there may be sudden changes or even discontinuities in the supply of electric energy compared to the instantaneous demand of the user served by the distributor 300, if nominal threshold power values are used for the calculations.

To avoid this, it is advantageous to have the device $D_i$ 300 make its own calculations not on the basis of the instantaneous power actually produced by the local source $P_{FEL}(t)$, but on the basis of a lower value $P'_{FEL}(t)$, typically 10%-20% less, for example, so as to keep a certain safety margin.

No energy will be wasted, because any remaining FLE power will be sold to the network, i.e. it will not be lost. In this way, the devices 300 can take action at once in the event of sudden peaks of absorption, by operating the combiner mechanisms without causing any interruptions in the power supply to the users.

A situation has been assumed wherein supply to all users cannot be interrupted, i.e. wherein the power supply system must ensure continuity of supply as long as absorption stays within the contractual conditions, i.e. in this specific case, below a nominal value of maximum allowable power.

The energy management criteria may of course be adapted to the case of interruptible users, wherein an interruption of the electric supply can be tolerated, even only within certain limits and under particular conditions, e.g. always or at certain hours of the day and/or on certain days of the week and/or in certain time slots and/or for certain maximum interruption intervals, and the like. In such cases, the distributor 300 will take that criterion into account when supplying energy to the respective user, also considering the total available energy and the co-ownership energy consumption.

In the case of simultaneous presence of interruptible and non-interruptible users in the same system, an energy management criterion with different priority groups can be used: the electric power $P_{FEL}(t)$ generated by the FLE is all assigned, up to a first threshold value P1, to the non-interruptible user group according to a given division criterion, while the energy exceeding P1, up to the threshold value P2>P1, is assigned to the interruptible user group according to another energy division criterion.

As an alternative, $P_{FEL}(t)$ may always be destined to the demand of the non-interruptible user group, while any production in excess of said demand will be assigned to the interruptible users.

It is therefore useful that the smart meters 320 integrated into the devices 300 can communicate with one another and possibly also with a management server (whether jointly owned or provided by a DLSE), so that they can dynamically act as energy flow regulators.

When equipped with a communication interface, the smart meters built in the devices 300 can thus act as a residential node for a "smart" and coordinated management of domestic consumptions. They can therefore communicate with the loads of the single users (e.g. household appliances, lighting devices, battery chargers, air conditioning systems, etc.) so as to be able to implement all the managed consumption techniques which are typical of smart grids.

FIG. 4 is a general block diagram that enriches the functionalities of a generic device 300, with a view of using it for implementing the so-called smart grids. In particular, it highlights that said device can have the processing and storage capabilities necessary for carrying out the more complex management functions which are typical of smart grids (e.g. switching loads on/off, communicating with loads or adjusting the absorption thereof depending on cost information and instantaneous energy availability).

The dashed connection between the meter 220 of the public energy distributor and the device 300 indicates that the latter can be included both in contexts wherein energy is distributed via a smart meter enabled to exchange information and wherein distribution takes place traditionally through a simple meter only measuring supplied energy.

In the former case, in the presence of smart meters 220, the device 300 can exchange data of various nature useful for the application of the energy management criterion; these data may comprise information about the state of the network 110 (general consumption peaks, applied rates), consumption history, instantaneous power absorbed from the network 110, as well as information about the co-ownership system (power absorbed by the user from the FLE) or even the state of residential user apparatuses, if the device 300 also incorporates the aforesaid smart-grid functionalities. These data exchanges may occur as shown in FIG. 4 via a dedicated connection line BD, or by means of the electric line between the device $D_i$ 300 and the meter 200.

Among the advantages offered by the inclusion of devices 300 as described, there is the possibility of managing with smart-grid criteria also situations wherein energy is supplied by distributors that have not adopted such functionalities yet, and therefore are not using advanced smart meters.

Moreover, since the device 300 can be made distinct from the meter 220 (whether a smart meter or a traditional meter), the application of consumption coordination criteria among users who have subscribed to different DLSE's is facilitated.

In general, in order to be able to perform its tasks, a device 300 needs a data processing unit (e.g. with a microprocessor or wired logic) operating on the basis of data stored in a local memory, which contains the control microprogram and the data required for implementing the desired energy distribution criterion. Data communication interfaces may also be included to allow the data processing unit to exchange information with other devices 300 and/or with a co-ownership management server.

Optionally, there may also be a direct communication interface for an external unit (e.g. PC, personal digital assistant, etc.), through which an operator can exchange data with the device 300 in order to carry out various operations, such as software updates, diagnostic tests, data exchanges, etc.). These latter operations may also be carried out by a co-ownership server (not shown in the drawings) adapted to manage the devices 300 in a centralized manner.

In principle, the devices 300 may use a centralized power distribution control instead of the distributed control described so far. With this alternative approach, all decisions of the system, and hence the intelligence thereof, are concentrated into a single central server that continually receives information about the power flows over a data bus connected to the devices 300, makes appropriate decisions based on the applicable energy management criterion, and sends appropriate power flow adjustment commands to said devices, which act as power flow meters and regulators.

This allows using simpler and cheaper devices 300, equipped with a simplified operating logic that does not make the structure and the operation of such apparatuses any more complex; this is desirable especially when they are provided with residential control functionalities of the smart-grid type, so that they can control and manage the user apparatuses directly connected to them.

It should be noted that said co-ownership server can advantageously be connected to the node A of FIG. 2 and use the same electric line to communicate with all the devices 300 via conveyed waves without needing a dedicated communication line, which may however be used as an alternative or additional measure.

This description has emphasized the opportunity of maximizing self-consumption in order to minimize energy transportation and the resulting losses and management inefficiencies. Some examples of implementation and operation of the devices 300 and of the remaining part of the network, suitable for such a purpose, have been illustrated herein. Such examples are not to be understood in an absolute or limiting sense, in that the devices 300 and the entire jointly-owned energy distribution network may also be managed in accordance with different general criteria. It may happen that, for example, due to special governmental incentives for renewable energy sources, tariff regulations or energy market dynamics, in certain periods or time slots it is advantageous to sell most of the energy produced by the FLE to the network, instead of self-consuming it, because the purchase price of (non-renewable) energy from the DLSE's network is lower than the sale price of the energy produced locally, since it is more eco-compatible. In general, therefore, it is possible to change the ways in which the devices distribute the energy supplied by the input sources depending on the prices at which the local distributor is selling and/or buying electric energy.

More in general, the devices 300 and/or the co-ownership centralized server can actuate any power flow management criterion, even discordant from the self-consumption maximization criterion, such as, for example, maximizing the profit attainable from the system, minimizing the running costs of the system, and the like.

A set of variables can be conceived for those cases wherein there is more than one external supplier.

One example that will probably undergo further development is the case wherein there is a possibility of taking energy from multiple public distributors, as opposed to just one. In this case, a device 300 will be adjustably connected to such different power distributors through the respective meters 220, and will take energy from that distributor which, at any given moment, is selling energy at the lowest price, while interrupting the power flow from the other distributors. It may also be advantageous to have multiple distributors, since the fixed cost of a supply of nominal installed power $P_N$ with a single distributor is higher than that of two smaller supplies from two energy distributors making up a total installed power equal to or greater than $P_N$. Also, this will give the possibility of maximizing the profits attainable from the local source by selling the produced energy to different distributors, who might purchase it at different prices at different hours of the day and/or in different periods of the year.

A further case that could lead to variants of the present invention is the one wherein a community of users can take energy not only from its own FLE, but also from the FLE of a nearby community, perhaps also with different priority. Such a case could determine a further reduction in the energy produced locally and sold to a DLSE.

The generic device 300 may also handle, as a load of its own, a storage system or the recharge of electric vehicles, and the latter may have to be recharged via a distinct or partially distinct infrastructure.

In short, the devices 300 described herein represent a simple solution for the evolution of residential consumption from the current state, characterized by individual consumptions (generally using energy coming from a distributor), to a state characterized by energy islands with coordinated consumptions and with the possibility of increasing the degree of energy self-sufficiency through rational FER utilization.

FIG. 4 clearly shows that the device 300, since it can be used in a very flexible manner to implement the smart-grid concepts, incorporates in its general versions a real general-purpose server 340 equipped with a memory 341.

It is apparent that, from this viewpoint, the device 300 can be considered to be a real residential server which, in addition to the functions described herein for the purposes of the present invention, can execute and manage numerous applications which are typical of a smart home, and thus may, for example, incorporate functions relating to comfort, domotics, security, safety, entertainment, remote control, and the like.

It is also conceivable to employ a suitably controlled jointly-owned accumulator (not shown in FIG. 2, where it would be connected to the node A) to store the energy produced in excess by the FLE (e.g. when there is solar radiation or a strong wind) and/or the energy supplied by the network 110 when energy can be purchased from a distributor at an advantageous price, and to yield energy to users when local production is insufficient or when energy cannot be favorably purchased from the network. The presence of a jointly-owned accumulator shared by the local users also allows to better compensate for the already described operational delays introduced by the devices 300 or by the centralized server, if used, thus further reducing the risk of any undesired supply discontinuity or interruption due to such insuppressible delays.

The present invention can advantageously be implemented through a computer program, which comprises coding means for implementing one or more steps of the method when said program is executed by a computer. It is therefore understood that the protection scope extends to said computer program as well as to computer-readable means that comprise a recorded message, said computer-readable means comprising program coding means for implementing one or more steps of the method when said program is executed by a computer.

The above-described embodiment example may be subject to variations without departing from the protection scope of the present invention, including all equivalent designs known to a man skilled in the art.

The advantages deriving from the application of the present invention are apparent.

The main advantage of the present invention is that the energy produced by a FLE belonging to a community of users can be managed in accordance with any commonly shared criterion without by any means interfering with energy supplies from a DLSE already in existence prior to the installation of the FLE, in compliance with the regulations and constraints imposed by governmental authorities that control the public energy distribution.

In particular, very flexible and diversified FLE management criteria are possible, which allow, for example, to maximize energy self-consumption or the profits deriving from FLE energy production, depending on specific needs and desires shared by the community to which the FLE belongs.

A further advantage is that the energy produced by a FLE belonging to a community of users can be managed by introducing new apparatuses that can be easily integrated into systems already in existence prior to activation of the FLE.

Yet another advantage is that such apparatuses allow for a gradual implementation of all the concepts of the so-called smart-grid scenarios, without having to wait for energy distributors to take initiative.

From the above description, those skilled in the art will be able to produce the object of the invention without introducing any further construction details.

The invention claimed is:

1. A device for managing a supply of electric energy to a user belonging to a community of users, each of said users in said community of users being a local user and sharing at least one system for producing electric energy from a local source, said device configured to be connected locally to said local source, said device allowing the local user of said community to receive a fraction of said energy produced by said local source without interacting with an external distributor of energy and without using electric grid connections, wherein said energy can be allocated and self-consumed locally by said local user of said community, said device being connected with said local source in parallel with other devices of other local users of the community, said other devices having a similar structure and functionality as said device, wherein said other devices of the community are configured to allow said other local users to each receive a fraction of said energy produced by said local source without interacting with an external distributor of energy and without using electric grid connections to the external distributor, and wherein said device is configured to receive energy from said local source and at least one system for supplying electric energy managed by the external distributor by using electric grid connections, wherein said local source is connected to the electric grid through a two way meter and wherein said device and said other devices are connected at a point between said local source and said two way meter, said device comprising:

a combining circuit configured to combine electric energy coming from said at least one system for producing energy from said local source and from said at least one system for distributing energy managed by an external distributor; and an adjusting circuit configured to adjust the fraction of electric energy supplied to said local user from said local source as a function of the electric energy coming from said local source that must be supplied, by means of said parallel connections, to the other local users of said community;

wherein said adjusting circuit is configured to receive information about a fraction of energy produced by said local source not used by at least another local user of said community, and, in case of need, giving priority to taking electric energy directly from said system for producing energy from a local source over said at least one system for supplying electric energy managed by an external distributor by drawing a higher amount of energy from said local source if said unused fraction is available; and a circuit configured to prevent the electric energy managed by the external distributor and received by the device from flowing back to the two way meter and wherein said circuit is configured to allow the fraction of said energy received from said local source to only flow to said user associated with said device.

2. The device according to claim 1, wherein said adjusting means are configured to exclude the supply of electric energy from said at least one system for supplying electric energy managed by an external distributor, if said system for producing energy from a local source can supply all the required electric energy to said local user.

3. The device according to claim 1, comprising a metering circuit for metering the electric energy that is being supplied to said local user from said local source.

4. The device according to claim 1, comprising an electronic communication interface for communicating with other devices associated with other local users belonging to said community.

5. The device according to claim 4, wherein said adjusting circuit for adjusting the fraction of electric energy distributed to said local user, coming from said local source, are so configured as to determine said fraction on the basis of information about the electric energy coming from said local source and supplied to other local users belonging to said community, said information being received through said interface for communicating with other devices and/or through said interface for communicating with a management system.

6. The device according to claim 1, comprising an interface for communicating with a system for managing the supply of electric energy by said at least one system for producing energy from a local source.

7. The device according to claim 1, comprising a component for one-way power flow control on the line transporting electric energy from said at least one system for producing electric energy from a local source, which only allows electric energy coming from said at least one system for producing electric energy from a local source to be carried on said line.

8. The device according to claim 1, wherein said device is physically integrated into a meter of an external distributor of electric services, said meter being of the smart type or being a meter adapted to measure distributable electric energy only.

9. The device according to claim 1, comprising a connecting circuit for connecting to an electric energy storage system, said connecting circuit being so configured as to allow storing electric energy coming from said system for producing electric energy from a local source and/or from said at least one system for supplying electric energy managed by an external distributor.

10. A method for managing a supply of electric energy to a community of users, each of said users in said community of users being a local user and sharing at least one system for producing electric energy from a local source, wherein each of said local users is connected locally through respective devices with said local source in parallel, said at least one system allowing the local users of said community to each receive a fraction of said energy produced by said local source without interacting with an external distributor of energy and without using electric grid connections, wherein said energy from said at least one system can be allocated and self-consumed locally by said local users of said community, wherein said devices allow the local users of said community to receive energy from both said at least one system for producing electric energy from a local source and at least one system for supplying electric energy managed by an external distributor by using electric grid connections, wherein said local source is connected to the electric grid through a two way meter, wherein said devices connect to the local source at a position between the local source and the two way meter, the method comprising:

determining a supply, to each local user of said community, of a combination of electric energy coming from said at least one system for producing energy from a local source and from said at least one system for supplying energy managed by an external distributor, wherein said electric energy combination can be determined specifically for each local user;

adjusting, for each local user of said community, the supply of the fraction of electric energy coming from said local source, as a function of the electric energy coming from said local source to be distributed to the other local users of said community;

receiving for each local user information about a fraction of energy produced by said local source not used by at least another local user of said community, and, in case of need, giving priority for each local user to taking electric energy directly from said system for producing energy from a local source over said at least one system for supplying electric energy managed by an external distributor by drawing a higher amount of energy from said local source if said unused fraction is available; and preventing the electric energy managed by the external distributor and received by the devices from flowing back to the two way meter, wherein, for each local user, said device allows said fraction of energy produced by said local source to flow only to said user associated with said device.

11. The method according to claim 10, wherein said fraction of electric energy coming from said local source is fixed for one or more local users of said community.

12. The method according to claim 10, wherein said fraction of electric energy coming from said local source is variable for one or more local users of said community as a function of the electric energy that is being distributed from said local source to other local users of said community.

13. The method according to claim 10, wherein said adjustment of the fraction of electric energy supplied to said user from said local source is such that it excludes the supply of electric energy from said at least one system for supplying electric energy managed by an external distributor, if said system for producing energy from a local source can supply all the required electric energy to said local user.

14. The method according to claim 10, wherein said adjustment of the fraction of electric energy supplied to said local user from said local source is determined also as a function of the purchase price of electric energy purchased from said at least one system for supplying electric energy managed by an external distributor and/or of the selling price of electric energy sold to said at least one system for supplying electric energy managed by an external distributor.

15. The method according to claim 10, comprising a step of controlling a connection to an electric energy storage system, so as to allow storing electric energy coming from said system for producing electric energy from a local source and/or from said at least one system for supplying electric energy managed by an external distributor.

16. The method according to claim 10, wherein it is carried out at least in part either in a centralized manner or in a distributed manner at the level of said local users.

17. A system for managing the supply of electric energy to local users belonging to a community of users, said community having available at least one system for producing electric energy from a local source and at least one system for supplying electric energy managed by an external distributor, comprising, for each local user, a device according to claim 1.

18. A non-transitory computer-readable storage medium comprising a recorded program, said non-transitory computer-readable storage medium comprising program coding means adapted to implement the method according to claim 10 when said program is executed on a computer.

* * * * *